(12) United States Patent
Park et al.

(10) Patent No.: US 8,996,219 B2
(45) Date of Patent: Mar. 31, 2015

(54) SYSTEM AND METHOD FOR CONTROLLING LOW-VOLTAGE DC/DC CONVERTER (LDC) OF HYBRID ELECTRIC VEHICLE

(71) Applicant: Hyundai Motor Company, Seoul (KR)

(72) Inventors: Dae Ro Park, Hwaseong-si (KR); Ji Yeol Park, Seoul (KR); Seok Min Jeong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/139,624

(22) Filed: Dec. 23, 2013

(65) Prior Publication Data

US 2015/0046001 A1 Feb. 12, 2015

(30) Foreign Application Priority Data

Aug. 9, 2013 (KR) ........................ 10-2013-0094607

(51) Int. Cl.
*B60L 9/00* (2006.01)
*B60L 11/18* (2006.01)
*B60L 15/04* (2006.01)

(52) U.S. Cl.
CPC ............. *B60L 11/1805* (2013.01); *B60L 15/04* (2013.01); *B60L 2210/10* (2013.01)
USPC ........................................... 701/22; 318/139

(58) Field of Classification Search
USPC ............. 701/22; 318/139, 778, 800, 801, 376
See application file for complete search history.

(56) References Cited

U.S. PATENT DOCUMENTS

2008/0140275 A1* 6/2008 Chung et al. ..................... 701/22

FOREIGN PATENT DOCUMENTS

| JP | 2001-320807 A | 11/2001 |
|---|---|---|
| JP | 2007-237774 A | 9/2007 |
| JP | 2008-007030 A | 1/2008 |
| KR | 10-1999-0035009 A | 5/1999 |
| KR | 10-0992820 A | 6/2006 |
| KR | 10-2011-0063273 A | 6/2011 |
| KR | 10-1164002 A | 2/2012 |
| KR | 10-2012-0109883 A | 10/2012 |
| KR | 10-2013-0003978 A | 1/2013 |

* cited by examiner

*Primary Examiner* — Thomas G Black
*Assistant Examiner* — Luke Huynh
(74) *Attorney, Agent, or Firm* — McDermott Will & Emery LLP

(57) ABSTRACT

A method and system for controlling a low-voltage DC/DC converter (LDC) of a hybrid electric vehicle (HEV) includes performing a trial starting comprising steps of: trying ignition start, performing an immobilizer authentication process, and turning on a main relay of a high-voltage battery. The LDC is controlled after the trial starting, so that an operating voltage is applied from the LDC to an electric load including various kinds of controllers, thereby allowing starting of the HEV.

6 Claims, 6 Drawing Sheets

SYSTEM AND METHOD FOR CONTROLLING LOW-VOLTAGE DC/DC CONVERTER (LDC) OF HYBRID ELECTRIC VEHICLE

CROSS-REFERENCE TO RELATED APPLICATION

This application claims under 35 U.S.C. §119(a) the benefit of priority to Korean Patent Application No. 10-2013-0094607 filed in the Korean Intellectual Property Office on Aug. 9, 2013, the entire contents of which are incorporated herein by reference.

TECHNICAL FIELD

The present disclosure relates to a system and method for controlling a low-voltage DC/DC converter (LDC) of a hybrid electric vehicle (HEV). More particularly, the present disclosure relates to a system and method for controlling an LDC of a hybrid electric vehicle, which can ensure starting performance of an HEV.

BACKGROUND

A hybrid electric vehicle (HEV) or electric vehicle, referring to FIG. 1, includes a high-voltage battery 10. An inverter 12 inverts a DC voltage into an AC voltage to supply the inverted AC voltage to a driving motor. An auxiliary battery 14 supplies the DC voltage to electric components of the vehicle when the vehicle starts and provides the voltage required to operate a main relay of the high-voltage battery 10. A low-voltage DC/DC converter (LDC) converts the DC voltage supplied from the high-voltage battery 10 to charge the converted voltage in the auxiliary battery 14 or supplies the DC voltage to the electric components.

The LDC 16 converts the voltage of the high-voltage battery 10 into a low voltage (+12V) to charge the auxiliary battery 14 like an alternator of a combustion engine. The LDC 16 supplies the converted voltage to various kinds of electric components (electric loads).

The LDC operates only when a starting (HEV ready) condition of the HEV is satisfied to charge the auxiliary battery or to supply the voltage to the electric components (including various kinds of controllers).

A conventional control method of operating the LDC when the HEV starts will be described as follows.

As shown in a flowchart of FIG. 2, the HEV is in a starting ready (HEV ready) state in which the HEV is capable of starting when steps are satisfied. Here, the steps include trying ignition start (IG start) by a driver under a condition in which the charged voltage of the auxiliary battery is normal, performing an immobilizer authentication process for vehicle security, turning on the main relay of the high-voltage battery, confirming that the electric loads including various kinds of controllers can be operated by the voltage supplied from the auxiliary battery, and so on.

In this case, the LDC becomes operable after the HEV starts to charge the auxiliary batter with the voltage from the high-voltage battery or to supply the voltage to various kinds of electric components.

However, in a case where the voltage of the auxiliary battery is lowered to a reference voltage (normal voltage) or less due to a low-temperature condition, such as in the winter, deterioration of durability caused by a superannuation of the vehicle, etc., the HEV may not start.

Referring to FIG. 3, in a case where the voltage of the auxiliary battery is reduced to a normal level (about 9V or more), operating voltage of various kinds of controllers related to the starting, such as a battery management system (BMS) and a motor controller (MC), is higher than the voltage of the auxiliary battery, which is reduced to the normal level or less, even though the step of ignition on (IG ON), the step of turning on the main relay, and the step of trying the ignition start (IG start) are performed. As a result, since starting of the HEV is impossible, the LDC does not operate.

That is, the auxiliary battery does not supply a suitable voltage for the operating voltage of each controller when the voltage of the auxiliary battery is lowered to the normal level or less, and therefore, the starting of the HEV is impossible.

SUMMARY

The present disclosure provides a system and method for controlling a low-voltage DC/DC converter (LDC) of a hybrid electric vehicle (HEV), in which although a voltage of an auxiliary battery is at a normal level or less when the HEV is ready for starting, the LDC operates regardless of the voltage of the auxiliary battery to supply an operating voltage to an electric load including various kinds of controllers, thereby allowing the starting the HEV.

According to an exemplary embodiment of the present disclosure, a method for controlling a low-voltage DC/DC converter (LDC) of a hybrid electric vehicle (HEV) performing a trial is provided. The method includes starting comprising steps of trying ignition start, performing an immobilizer authentication process, and turning on a main relay of a high-voltage battery. After the trial starting, an operation of the LDC is controlled, so that an operating voltage is applied from the LDC to an electric load including various kinds of controllers, thereby allowing starting of the HEV.

If a time period from when the trial starting is attempted to the starting of the HEV exceeds a reference time, the operation of the LDC may be prohibited.

When the trial starting fails twice or more, the LDC may be operated after the vehicle starts.

When the trial starting fails twice or more, a driver may be warned that a component related to the starting is abnormal.

According to another exemplary embodiment of the present disclosure, a system for controlling a low-voltage DC/DC converter (LDC) of a hybrid electric vehicle (HEV) includes an auxiliary battery for supplying a DC voltage to an electric component of the HEV when the HEV starts and providing a voltage required to operate a main relay of the high-voltage battery. The LDC converts the DC voltage supplied from the high-voltage battery to charge the auxiliary battery or to supply the converted voltage to the electric component. A voltage sensor senses whether the voltage of the auxiliary battery is at a normal level or less. A controller receives a signal from the voltage sensor to control an operation of the LDC when a trial starting is attempted or to prohibit the operation of the LDC when the time from when the trial starting is attempted to when the starting of the HEV exceeds a reference time.

The system may further include a warner for warning a driver that a component related to the starting is abnormal when the trial starting fails twice or more.

According to the present disclosure, although a voltage of the auxiliary battery is at a normal level or less when the HEV is ready for starting, the LDC operates regardless of the voltage of the auxiliary battery, to smoothly supply an operating voltage to an electric load, including various kinds of controllers, thereby allowing the various kinds of controllers related to the starting to be operable. Accordingly, normal starting of the HEV is possible.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
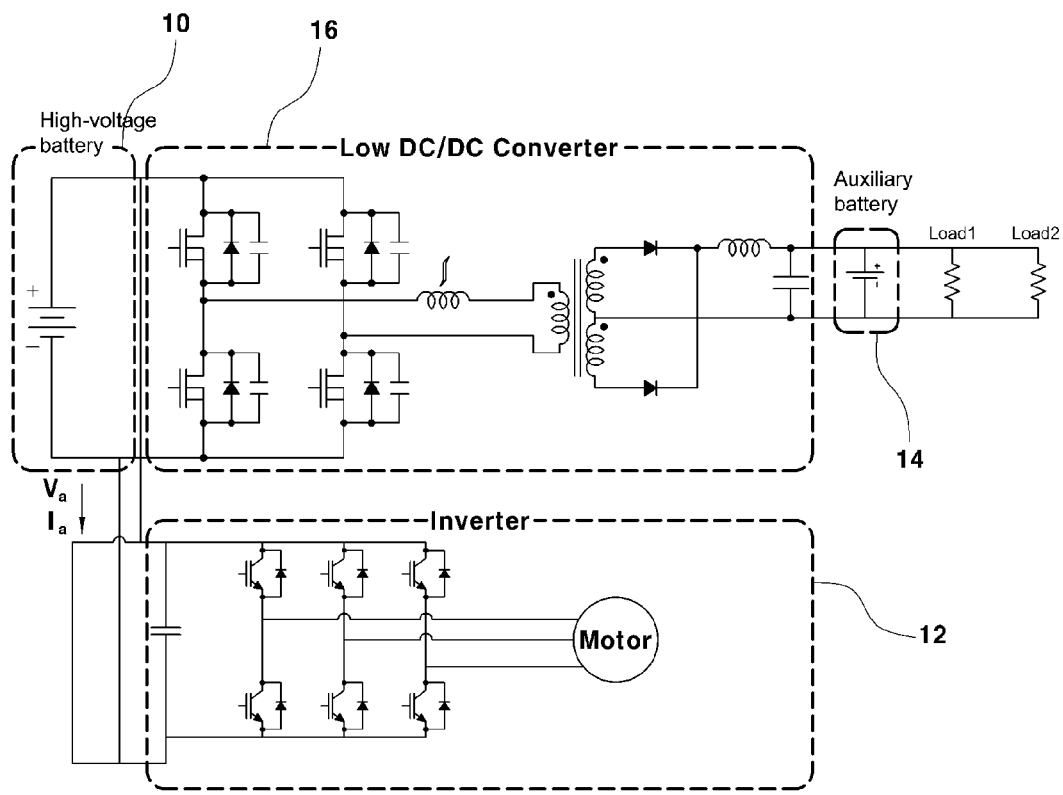
FIG. 1 is a configuration view illustrating a driving system of a hybrid electric vehicle (HEV).
Figure 2:
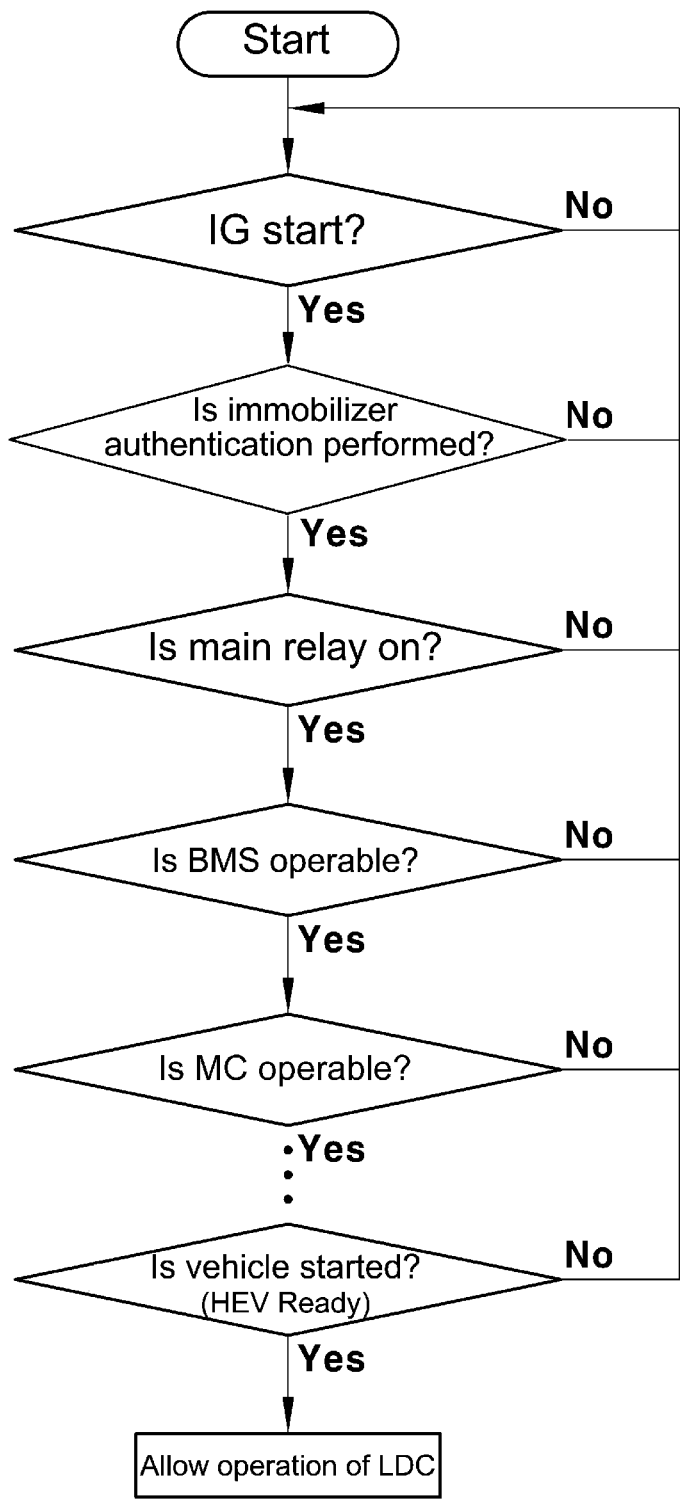
FIG. 2 is a flowchart illustrating a method for starting a conventional hybrid electric vehicle (HEV).
Figure 3:
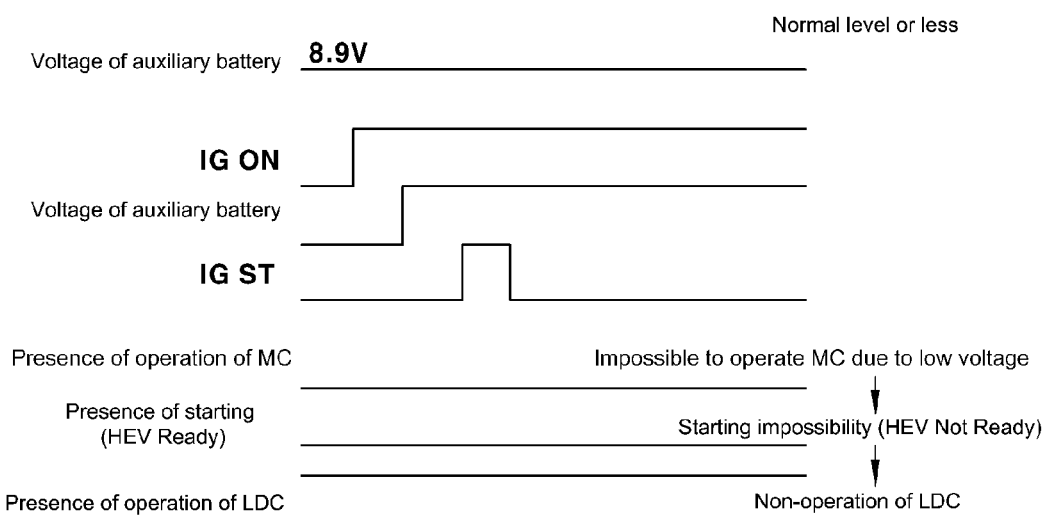
FIG. 3 is a control view illustrating a method for starting a conventional HEV.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Figure 6:
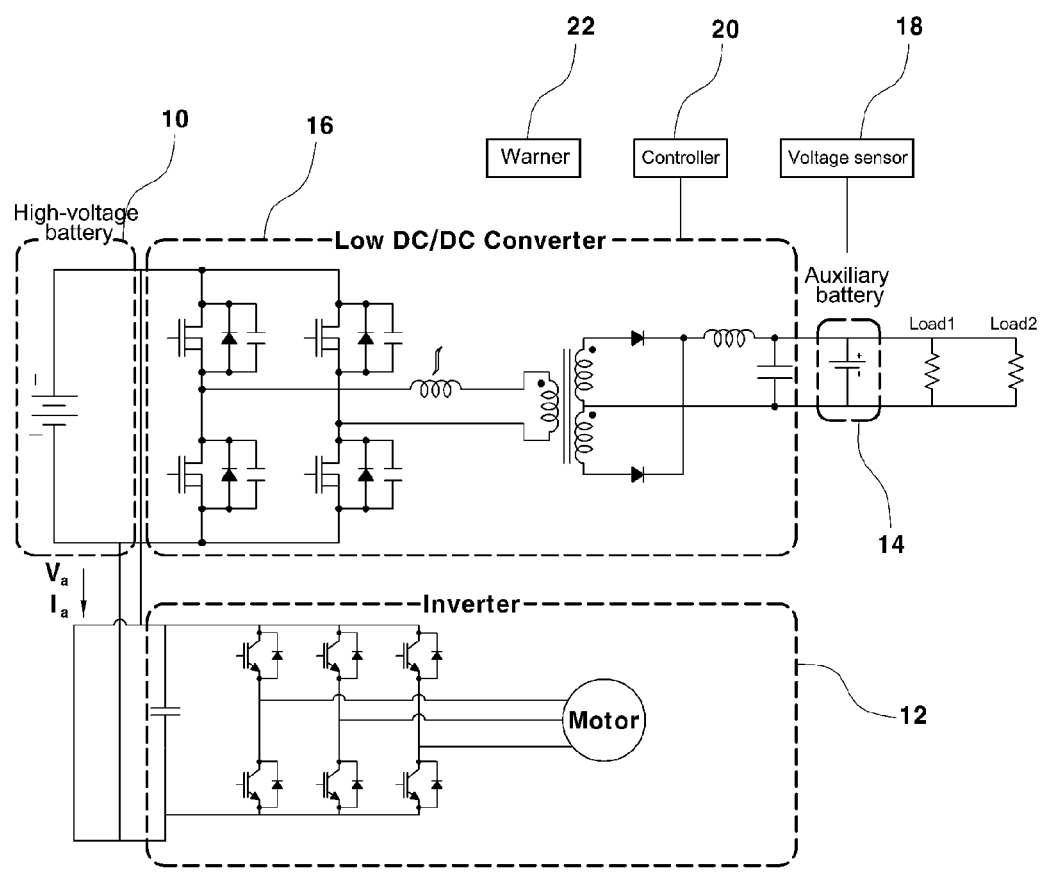
FIG. 6 is a configuration view of a system for controlling an LDC of an HEV according to an embodiment of the present disclosure.

Referring to FIG. 6, a hybrid electric vehicle (HEV) or an electric vehicle includes a high-voltage battery 10, an auxiliary battery 14 for supplying a DC voltage to electric components of the vehicle and providing a voltage required to operate a main relay of the high-voltage battery 10. A low-voltage DC/DC converter (LDC) 16 converts the DC voltage supplied from the high-voltage battery 10 to charge the converted voltage in the auxiliary battery 14 or supplies the converted voltage to the electric components.

In the conventional HEV, an appropriate operating voltage from the auxiliary battery is not supplied during a process of starting the HEV, and hence, electric components related to the starting of the HEV do not operate. Therefore, the starting of the HEV is impossible. Accordingly, in the present disclosure, although the voltage of the auxiliary battery is at a normal level or less, the LDC operates regardless of the voltage of the auxiliary battery, thereby allowing the starting of the vehicle.

To this end, the HEV of the present disclosure includes, as components for improving the starting performance of the HEV, a voltage sensor 18 for sensing a voltage state of the auxiliary battery 14, and a controller 20 for receiving a sensing signal of the voltage sensor 18 to operate the LDC 16 when the voltage state of the auxiliary battery 14 is at a normal level or lower.

The voltage sensor 18 senses that the voltage state of the auxiliary battery 14 is at the normal level or less and transmits the sensing signal of the controller 20.

The controller 20 receives the sensing signal of the voltage sensor 18 to control an operation of the LDC 16 when the trial starting is attempted or to prohibit the operation of the LDC 16 when a time period from when the trial starting is attempted to the starting of the vehicle exceeds a reference time.

Meanwhile, the HEV further includes a warner 22 for warning a driver that a component related to the starting of the vehicle is abnormal when the trial of the starting fails twice or more, to repair of the vehicle.

Figure 4:
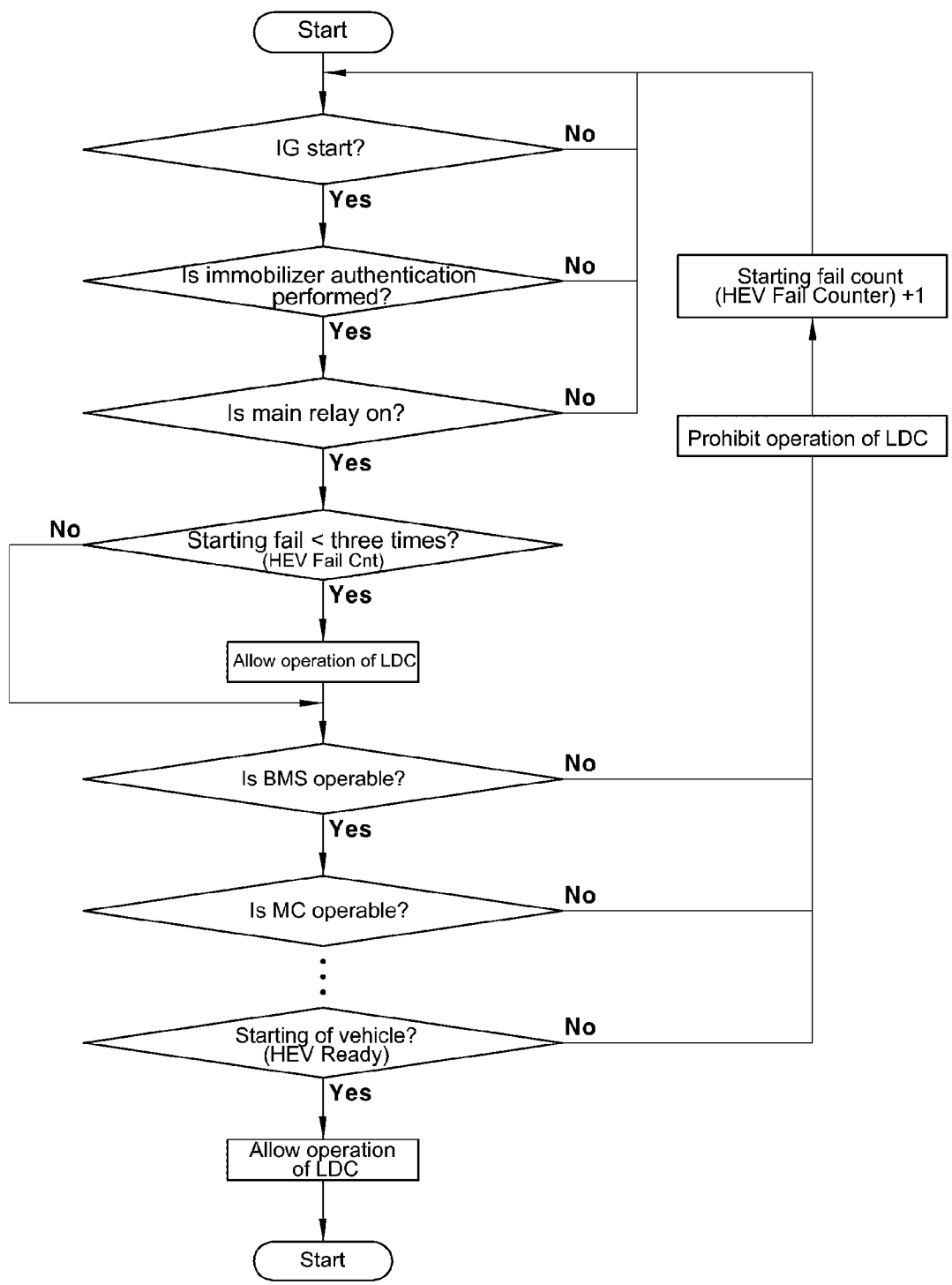
FIG. 4 is a flowchart illustrating a method for starting an HEV and a method for controlling a low-voltage DC/DC converter (LDC) of an HEV according to an embodiment of the present disclosure.

A method for starting an HEV and a method for controlling an LDC of the HEV according to the present disclosure, based on the system described above, will be described with reference to FIGS. 4 and 5.

The method for trial starting the HEV includes trying ignition start, performing an immobilizer authentication process for vehicle security, and turning on a main relay of the high-voltage battery.

If the preceding steps including the step of the ignition start, the step of the immobilizer authentication, and the step of turning on the main relay are performed, the LDC operates regardless of a starting condition. That is, although the voltage of the auxiliary battery is at a normal level or less, the LDC operates regardless of the voltage of the auxiliary battery. More specifically, if the voltage sensor 18 senses that the voltage of the auxiliary battery is at the normal level or less, the voltage sensor 18 transmits the sensed result to the controller 20, and the controller 20 controls an operation of the LDC 16.

Thus, the LDC 16 converts the DC voltage supplied from the high-voltage battery 10 to charge the converted voltage in the auxiliary battery 14 or to supply the converted voltage to electric components related to the starting of the vehicle, such as a battery management system (BMS) and a motor controller (MC).

Figure 5:
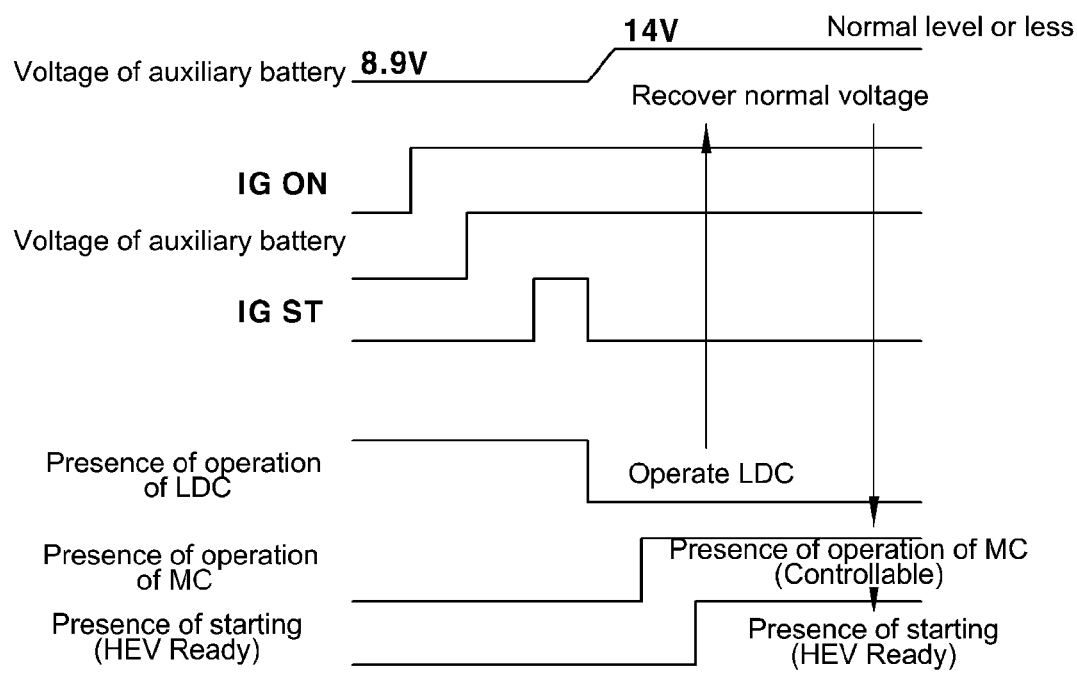
FIG. 5 is a control view illustrating a method for starting an HEV and a method for controlling an LDC of the HEV according to an embodiment of the present disclosure.

Referring to FIG. 5, the step of ignition on (IG ON), the step of turning on the main relay, and the step of ignition start (IG ST) are performed. As the LDC 16 operates, the voltage of the auxiliary battery, which is reduced to the normal level or less, can be recovered to the normal level by a charging operation of the LDC 16. Particularly, the electric components related to the starting of the vehicle receive an appropriate operating voltage supplied from the LDC 16 to be operable.

As the electric components related to the starting of the vehicle, such as the BMS and MC, smoothly operate as described above, the HEV can start. Accordingly, it is possible to solve a starting problem of the HEV which occurs when the electric components related to the starting do not receive an appropriate operating voltage in the conventional HEV.

If the time period from when the trial starting, including the step of ignition start, the step of immobilizer authentication, the step of turning on the main relay is attempted, to the starting of the vehicle by operating the LDC 16 exceeds the reference time, the controller 20 controls an operation the LDC 16. Thus, even though the vehicle does not start during the reference time necessary for the starting of the vehicle, voltage of the high-voltage battery is continuously supplied to the LDC is prevented.

In a case where the trial starting, including the step of ignition start, the step of immobilizer authentication, the step of turning on the main relay fails twice or more, it is determined that a component related to the starting (an ignition component, immobilizer component, main relay, or the like) is problematic. Thus, the operation of the LDC is controlled after the vehicle starts, and a driver is warned that a component related to the starting of the vehicle is abnormal and needs to be repaired.

According to the present disclosure, although the voltage of the auxiliary battery is at the normal level or less in the starting of the HEV, the LDC operates to smoothly supply an operating voltage to the electric component, so that the HEV starts normally by a normal operation of the various kinds of electric loads related to the starting. Accordingly, it is possible to solve a starting problem of the HEV.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling a low-voltage DC/DC converter (LDC) of a hybrid electric vehicle (HEV), the method comprising:
   performing a trial starting comprising steps of:
   trying ignition start;
   performing an immobilizer authentication process;
   turning on a main relay of a high-voltage battery; and
   after the trial starting, controlling the LDC, so that an operating voltage is applied from the LDC to an electric load including various kinds of controllers, thereby allowing starting of the HEV.

2. The method of claim 1, wherein if a time period between the trial starting is attempted to the starting of the HEV exceeds a reference time, the operation of the LDC is prohibited.

3. The method of claim 1, wherein, when the trial starting fails twice or more, the LDC is operated after the vehicle starts.

4. The method of claim 1, wherein when the trial starting fails twice or more, a driver is warned that a component related to the starting is abnormal.

5. A system for controlling a low-voltage DC/DC converter (LDC) of a hybrid electric vehicle (HEV), the system comprising:
   an auxiliary battery for supplying a DC voltage to an electric component of the HEV when the HEV starts, and providing a voltage required to operate a main relay of a high-voltage battery;
   an LDC for converting the DC voltage supplied from the high-voltage battery to charge the auxiliary battery or to supply the converted voltage to the electric component;
   a voltage sensor for sensing whether the voltage of the auxiliary battery is at a normal level or less; and
   a controller for receiving a signal from the voltage sensor to control an operation of the LDC when a trial starting is attempted or to prohibit the operation of the LDC when a time period from when the trial starting is attempted to when the HEV is started made exceeds a reference time.

6. The system of claim 5, further comprising a warner for warning a driver that a component related to the starting is abnormal when the trial starting fails twice or more.

* * * * *